US008950894B2

(12) United States Patent
O'Brien (10) Patent No.: US 8,950,894 B2
(45) Date of Patent: Feb. 10, 2015

(54) LIGHT SOURCE

(75) Inventor: Peter O'Brien, Cork (IE)

(73) Assignee: University College Cork—National University of Ireland (IE)

( * ) Notice: Subject to any disclaimer, the term of this patent is extended or adjusted under 35 U.S.C. 154(b) by 106 days.

(21) Appl. No.: 13/880,522

(22) PCT Filed: Oct. 19, 2011

(86) PCT No.: PCT/EP2011/068240
§ 371 (c)(1),
(2), (4) Date: Oct. 2, 2013

(87) PCT Pub. No.: WO2012/052470
PCT Pub. Date: Apr. 26, 2012

(65) Prior Publication Data
US 2014/0029254 A1    Jan. 30, 2014

(30) Foreign Application Priority Data

Oct. 19, 2010   (EP) .................................... 10188099

(51) Int. Cl.
| F21V 1/00 | (2006.01) |
| F21V 11/00 | (2006.01) |
| F21V 7/07 | (2006.01) |
| F21V 7/09 | (2006.01) |
| F21K 99/00 | (2010.01) |
| F21V 7/00 | (2006.01) |
| G01J 3/02 | (2006.01) |
| G01J 3/10 | (2006.01) |

(Continued)

(52) U.S. Cl.
CPC ... *F21K 9/50* (2013.01); *F21K 9/54* (2013.01); *F21V 7/0008* (2013.01); *G01J 3/0216* (2013.01); *G01J 3/10* (2013.01); *F21V 7/06* (2013.01); *F21Y 2101/02* (2013.01); *F21Y 2111/001* (2013.01); *F21Y 2113/00* (2013.01); *G02B 6/4298* (2013.01)
USPC .................. 362/235; 362/249.02; 362/296.05

(58) Field of Classification Search
CPC .......... F21Y 2111/001; F21Y 2113/00; F21Y 2101/02; G02B 6/4298; A01B 12/006; F21K 9/50; F21K 9/54; F21V 7/0008; F21V 7/06; G01J 3/0216; G01J 3/10
See application file for complete search history.

(56) References Cited

U.S. PATENT DOCUMENTS

| 4,148,045 A * | 4/1979 | Fang et al. ...................... 257/90 |
| 5,109,447 A | 4/1992 | Chan |

(Continued)

FOREIGN PATENT DOCUMENTS

| CA | 2570234 A1 | 6/2008 |
| EP | 2149807 A2 | 2/2010 |

(Continued)

OTHER PUBLICATIONS

International Search Report, European Patent Office, Aug. 27, 2012, 5 pp.

*Primary Examiner* — Donald Raleigh
(74) *Attorney, Agent, or Firm* — Volpe and Koenig, P.C.

(57) ABSTRACT

The invention provides a wide spectrum light source comprising a housing with an aperture, said aperture adapted to emit light; and a plurality of light emitting diode (LED) sources mounted in said housing, wherein said LED sources are arranged at different heights in said housing adapted to provide efficient wide spectrum operation of said light source.

15 Claims, 5 Drawing Sheets

(51) Int. Cl.
*F21V 7/06* (2006.01)
*F21Y 101/02* (2006.01)
*F21Y 111/00* (2006.01)
*F21Y 113/00* (2006.01)
*G02B 6/42* (2006.01)

(56) References Cited

U.S. PATENT DOCUMENTS

| | | | |
|---|---|---|---|
| 6,242,857 | B1 | 6/2001 | Hashimoto et al. |
| 7,182,497 | B2 * | 2/2007 | Lee et al. ............... 362/555 |
| 2003/0223236 | A1 | 12/2003 | Wu |
| 2003/0223248 | A1 | 12/2003 | Cronin et al. |
| 2004/0156199 | A1 | 8/2004 | Rivas et al. |
| 2004/0165379 | A1 | 8/2004 | Waters |
| 2005/0134527 | A1 | 6/2005 | Ouderkirk et al. |
| 2006/0072314 | A1 | 4/2006 | Rains |
| 2006/0267037 | A1 | 11/2006 | Lim et al. |
| 2011/0075412 | A1 * | 3/2011 | Wu et al. ............... 362/235 |
| 2011/0228536 | A1 * | 9/2011 | Im et al. ............ 362/249.06 |

FOREIGN PATENT DOCUMENTS

| | | |
|---|---|---|
| GB | 2374919 A | 10/2002 |
| WO | 2007130536 A2 | 11/2007 |
| WO | 2009016604 A1 | 2/2009 |

* cited by examiner

LIGHT SOURCE

FIELD OF INVENTION

The invention relates to a light source. In particular the invention relates to a wide spectrum LED light source.

BACKGROUND

Light sources are critical components in many analysis systems. The most common types are lamps such as Xenon, Mercury, Deuterium and Tungsten-Halogen lamps. These lamps are located within the analysis system alongside a detection unit, usually a semiconductor-based or photomultiplier-tube detection device. Typical modes of operation for these optical systems include absorption, reflection, scattering and fluorescence monitoring.

These systems are used in applications as diverse as chemical and materials analysis, medical diagnostics, bio-sensing and process monitoring. These are large established markets that are growing in size, such as in the field of medical diagnostics, that require portable or point of care diagnostics.

These lamps are considered to be specialty or high-value products when compared to lamps used for illumination or display. They emit a broad and continuous optical spectrum, often with a large component in the Ultra-Violet (UV) region, which is important for many sensing applications. They are also relatively difficult to manufacture and as a result, they often display variations or inconsistencies in performance which is a common problem reported by many users.

On top of this, the lamps have limited lifetimes, often of only a few hundred hours, and require careful handling such as the use of special power supplies and temperature control systems. However, even though these lamps can present such problems, they are used extensively and are considered a mature technology. To-date there has been no real effort to replace them, mainly due to the lack of a viable alternative.

Light Emitting Diodes (LEDs) have become a mature illumination technology over the past decade. They are used in many illumination and display applications and the cost benefits of implementing the LED option is becoming more attractive. The cost per lumen of LED products (a common price benchmark for lighting systems) is now approaching those of conventional lamps and their operating lifetimes can be an order of magnitude higher. Furthermore, where improvements in conventional lamps have stalled, LED technology is continuously improving (increased brightness and lower costs) and their business case becomes more compelling.

However, the main problem with LEDs is that they emit a relatively narrow optical spectrum and exhibit uneven levels of intensity across the optical spectrum. This is not a problem for most illumination and display applications, as the spectrum can be easily tailored to match the response of the eye. However, it is an issue for analysis systems that require a broad and continuous optical spectrum. In addition, developments in UV devices have to-date been slow, mainly due to the lower commercial demand relative to lighting and display markets. However, UV LEDs are now commercially available and their output powers meet the requirements for some applications. Currently, there is no effective alternative to conventional lamps for a wide spectrum optical source. The major problems associated with these sources are well documented and include:

Highly inefficient, generating large amount of heat.
Expensive and inconsistent optical performance.
Very short lifetimes and must be replaced regularly which can affect optical performance and mis-alignment issues.
Require complex power supplies and thermal management systems.
Can be dangerous (toxic, explosive and risk of burns and eye damage).
Not suitable for portable or handheld systems due to size restrictions and significant electrical power requirements.

A possible solid-state solution that currently exists is based on large area LED arrays. However, this simple technology is not suitable because the number of LEDs required to encompass the optical spectrum requires a large area device (typically 0.5 cm to 1.0 cm wide). This results in significant spatial or position dependence on emission wavelength, which is unacceptable for coupling into small apertures, such as spectrometers or optical fibres. In addition LED arrays on the market are usually monochromatic or comprised of a limited number of wavelengths, typically red, green and blue.

U.S. Pat. No. 5,109,447 discloses a high-powered, spectrally flat, very broadband optical source including optical coupler and method using same. This patent describes an array of LEDs coupled to a series of optical fibres using micro-lenses. U.S. Pat. No. 6,242,857: High efficiency fluorescent lamp with low colour rendering property. This patent is typical of the concept to use a UV or blue LED chip to excite a phosphor, with the combined emission providing a white or broadband colour. This general concept is widely used to create white light LEDs. US Patent publication number US2006/0267037A1 discloses a Light Emitting Diode Package. This patent publication describes a LED array of different colours and micro-lenses to diffuse and mix the colours to produce an even illumination pattern. Other patent publications in the art include US 2004/156199 (Rivas Nelson et al); US2003/223236 Wu Jiahn-Chang); GB 2 374 919 (Altman Stage Lighting Co Inc); CA 2570 234 (Erco Leuchten) and US 2004/165379 (Waters Ryan).

However none of these publications effectively provide an efficient wide spectrum light source. There is therefore a need to provide a wide spectrum light source that overcomes the above mentioned problems.

SUMMARY

According to the present invention there is provided, as set out in the appended claims, a wide spectrum light source comprising:
  a housing with an aperture, said aperture adapted to emit light;
  a plurality of light emitting diode (LED) sources mounted in said housing, wherein said LED sources are arranged at different heights in said housing to provide wide spectrum operation of said light source.

The invention provides a wide spectrum light source designed as a replacement product for specialty lamps used in analysis applications. The LED lamp is designed to emit a broad spectrum (or broadband) from a narrow aperture. The design of the light source enables the light source to be used for spectroscopic type applications. In addition, its unique features of small size, high efficiency and low power consumption, makes the light source attractive for emerging applications in portable analysis systems, such as point-of-care diagnostics, instrumentation manufacturers, blood analysis and chemical analysis.

In one embodiment said housing comprises a stepped base portion.

In one embodiment said stepped base portion provides a plurality of levels for mounting said light emitting diodes at different heights in said housing.

In one embodiment there is provided lower efficiency LEDs are mounted on said stepped base at a height higher than higher efficiency LEDs, such that said lower efficiency LEDs are positioned closer to said aperture.

In one embodiment lower efficiency LEDs are mounted in the centre of the housing for enhanced output coupling through the aperture.

In one embodiment internal walls of the housing are coated with a reflective material.

In one embodiment said base is coated with a reflective material.

In one embodiment said reflective material comprises barium sulphate.

In one embodiment at least two LEDs comprise the same wavelength to provide a smooth spectral profile or spectral balancing.

In one embodiment the housing comprises a light mixing cavity.

In one embodiment the housing comprises a phosphorous coating and/or quantum dot material that are adapted to excite electrons to fill gaps in the light spectrum.

In one embodiment the aperture comprises a narrow slit.

In one embodiment said housing comprises a stepped pyramid shaped base, wherein each step provides an area for mounting said LEDs.

In one embodiment each step of said base is angled to maximise the reflection in said housing.

In another embodiment of the invention there is provided a wide spectrum light source comprising:
 a housing with an aperture, said aperture adapted to emit light;
 a plurality of light emitting diode (LED) sources mounted in said housing, said LED sources are arranged at different heights in said housing adapted to provide wide spectrum operation of said light source characterised in that:
 said housing comprises a reflector and a stepped base portion wherein lower efficiency LEDs are mounted on said stepped base portion at a height higher than higher efficiency LEDs, such that said lower efficiency LEDs are positioned closer to said reflector.

In one embodiment the reflector is adapted with a parabolic reflector surface and dimensioned to reflect light emitted from said LED sources and out through said aperture.

In a further embodiment of the present invention there is provided a housing for a light source having a number of LED light sources, said housing comprises a stepped base portion wherein lower efficiency LEDs are mounted on said stepped base portion at a height higher than higher efficiency LEDs, such that said lower efficiency LEDs are positioned closer to an aperture.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE PREFERRED EMBODIMENTS

LED light sources are extremely compact, efficient and reliable light sources, they emit a relatively narrow optical spectrum, typically 20 nm. To overcome this limitation in their spectral performance, LEDs of different emission wavelengths can be assembled in a two-dimensional array, where the combined output covers the broad spectrum required. However, this format results in different wavelengths being emitted at different positions on the array and the format is not suitable for applications that require coupling to a small area, such as to spectrometer slits, optical fibres, small cuvettes or liquid capillaries.

Figure 1:
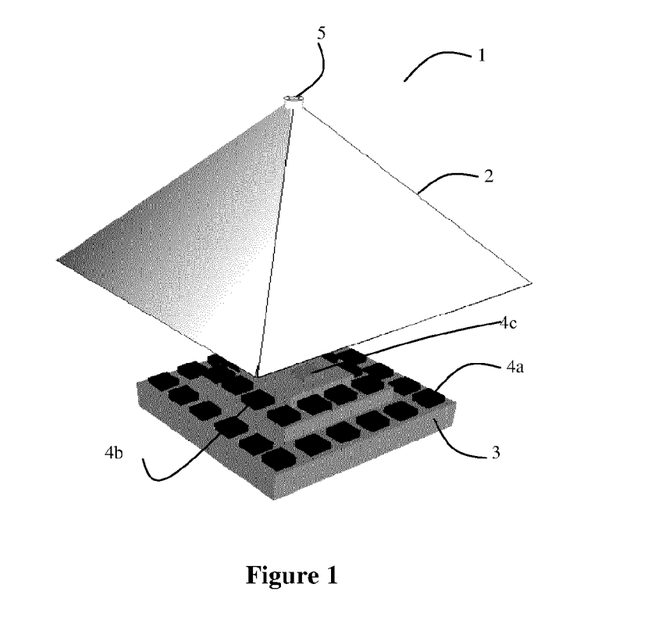
FIG. 1 illustrates a 3D perspective view of a wide spectrum light source, according to the invention.
Figure 2:
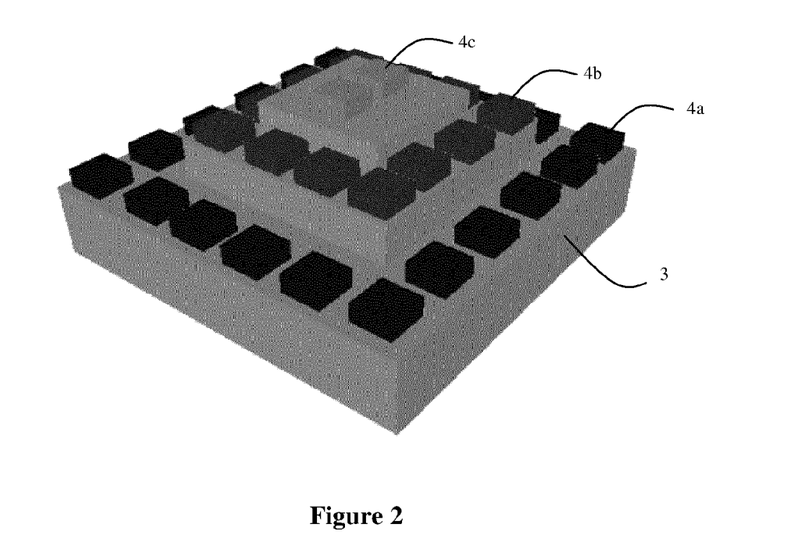
FIG. 2 illustrates an enlarged 3D perspective of stepped base portion according to the invention.

Referring now to the Figures, and initially FIGS. 1 and 2 illustrates a 3D perspective view of a wide spectrum light source, indicated generally by the reference numeral 1. A housing 2 comprises a stepped base portion 3. A plurality of light emitting diode (LED) sources 4a, 4b and 4c are mounted on the stepped base portion 3 in said housing 2 and arranged at different heights (or levels) in said housing to provide efficient wide spectrum operation of the light source. The housing 2 comprises an aperture 5, said aperture 5 is adapted to emit light at a desired wavelength.

The invention overcomes the aforementioned problems by combining the concept of the LED array to provide broadband emission with a novel housing 2 or integrating sphere or light mixing cavity to homogenously combine all wavelengths by arranging the LED sources 4a, 4b and 4c at different heights provides for a wide spectrum operation with a smooth profile. It will be appreciated that there is no restriction on the number of heights that can be used. The output aperture 5 or slit allows for emission of the homogenously mixed beam from the housing 2.

Figure 3:
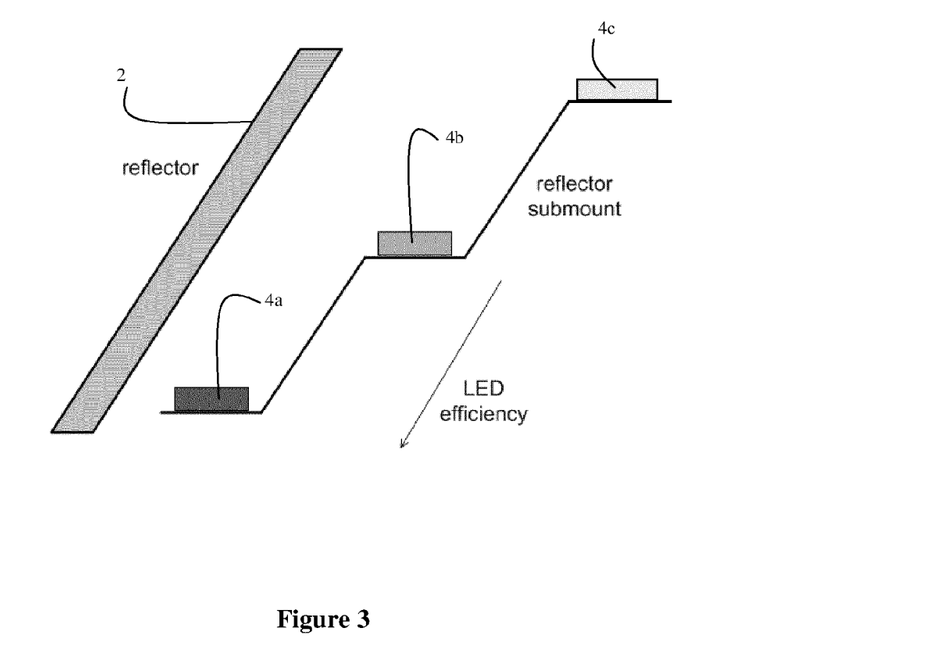
FIG. 3 illustrates a side cut through view of a portion of the wide spectrum light source.

Referring to FIG. 3 the LED array can be configured such that the lowest efficiency LEDs 4c are favourably located in the housing (cavity) to ensure their optical emission is closely coupled to the output slit 5. In other words lower efficiency LEDs are mounted on said stepped base portion 3 at a height higher than higher efficiency LEDs, such that said lower efficiency LEDs are positioned closer to the aperture 5. The lower efficiency LEDs can also be preferably mounted in the centre of the housing 2 for enhanced output coupling through the aperture 5. In one embodiment the LED substrate or platform base supporting the array is preferably designed in a three-dimensional pyramidal format to further enhance output coupling of the lower efficiency LEDs. For example, UV LEDs typically below 365 nm tend to have lowest efficiencies and these would be assembled as described above. Each step of the base is angled to maximise the reflection of light in said housing to exit the aperture 5.

Figure 4:
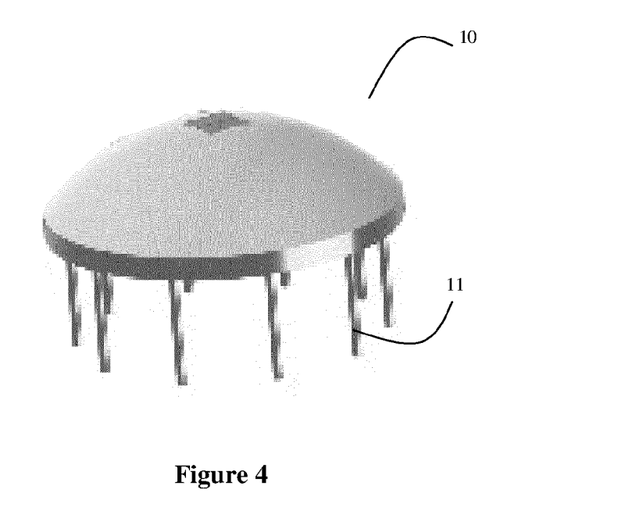
FIG. 4 illustrates a view of a sample light source with an alternative shaped cavity or housing.
Figure 5:
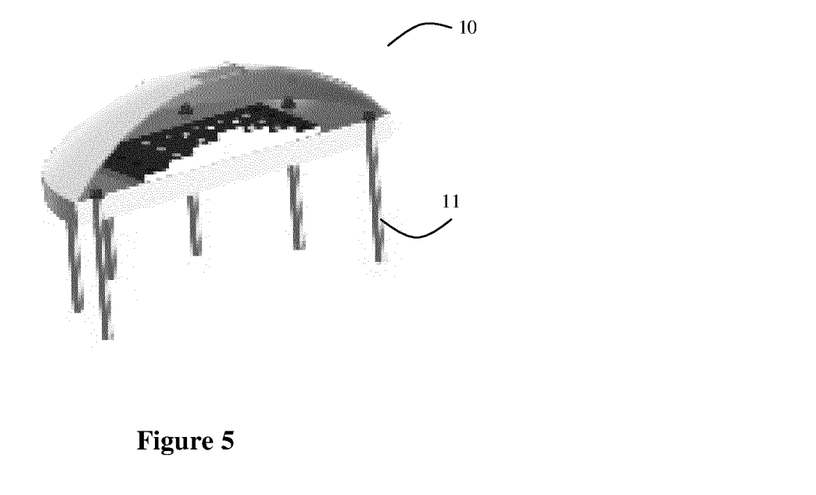
FIG. 5 is a cut through view of FIG. 4.

FIGS. 4 and 5 illustrates the concept of the LED array, integrating sphere and output aperture to provide the homogenous broadband output, indicated generally by the reference numeral 10, and operates on the same principle as described with respect to FIGS. 1 to 3. LED sources of different wavelengths are assembled in a 3D array and the array sits within a light integrating dome or mixing cavity. The cavity can be coated internally with Barium Sulphate or a similar coating material exhibiting high reflectivity to facilitate light mixing. At the base of the light source a number of pins 11 project that are adapted to cooperate with a control board and/or power supply (not shown). Control signals can be supplied through the pins 11 that control the operation of individual LED's that allows for wide spectrum operation depending on the application required. Individual LEDs are positioned on the array such that lower efficiency devices are favourably located to maximise their output coupling through the optical window. The configuration of the dome, design of the array and location of the LEDs on the array will be critical to achieve homogeneous spectral and power performance. This is a unique design and the different elements constitute the principle claims of the invention.

Another unique feature of the LED array is the possible integration of multiple LEDs of the same wavelength to ensure a smooth spectral profile or spectral balancing. This is desirable where LEDs of certain wavelengths have lower efficiencies. For example, UV, green and red devices tend have lower efficiencies than blue devices. It is suggested a 3:1 ratio or balance between minimum and maximum spectral peaks is desirable. Different emission wavelengths can produce a continuous spectrum by having an ideal spectral separation of 25 to 30 nm between each wavelength. LEDs with lower efficiencies will require multiple devices on the array.

Figure 6:
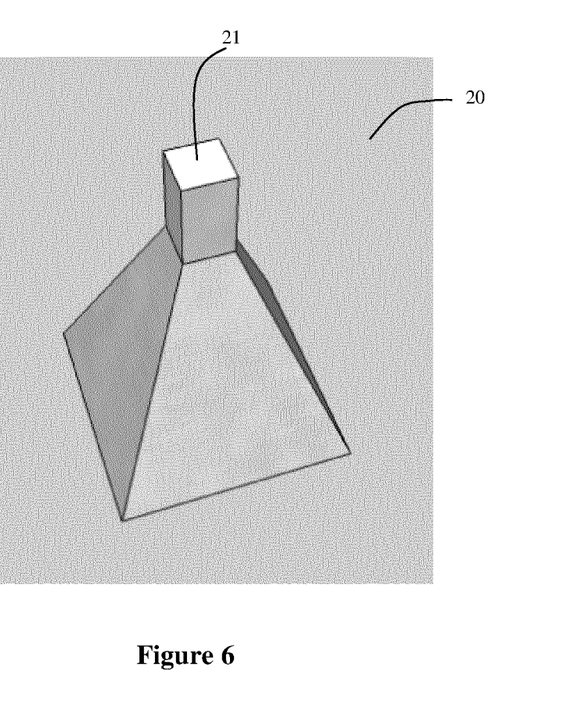
FIG. 6 illustrates an alternative embodiment of the wide spectrum light source according to another aspect of the invention.

FIG. 6 illustrates an alternative embodiment of the wide spectrum light source comprising a different shaped housing, indicated generally by the reference numeral 30. The housing or cavity is shaped with an elongated portion 31 adapted to maximise reflections to improve efficiency of the side spectrum light source.

Figure 7:
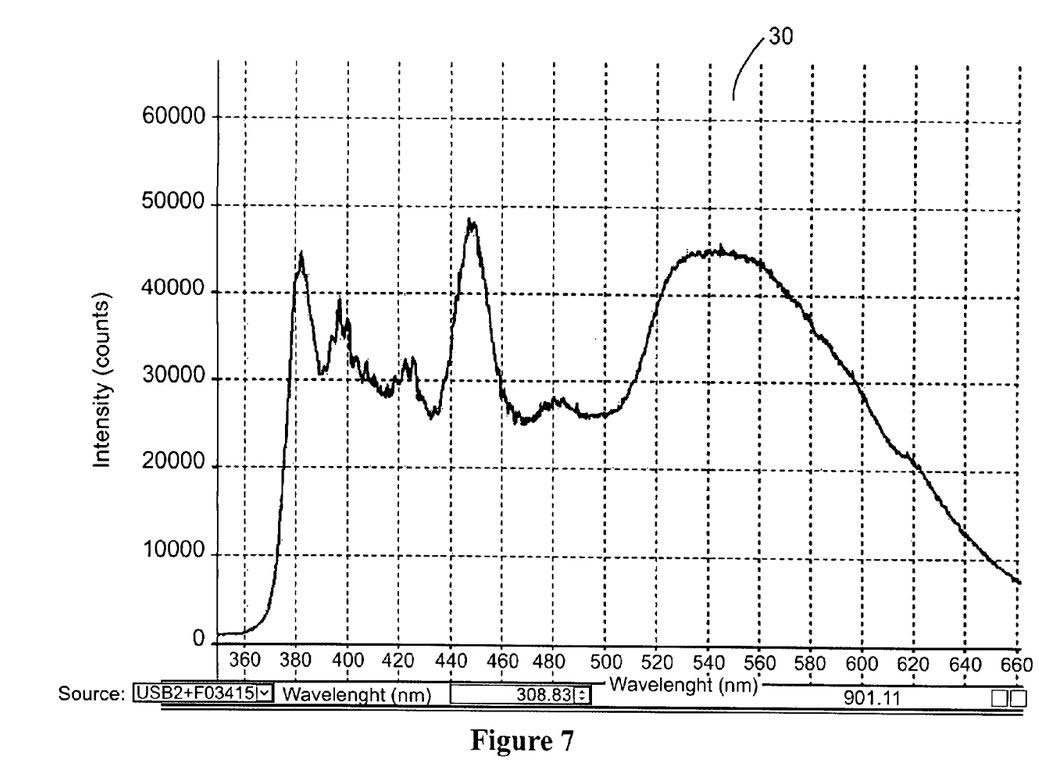
FIG. 7 is a graph showing homogenous spectrum operation of the light source according to the invention.

FIG. 7 is a graph showing homogenous spectrum operation of the light source over a broad spectrum indicated generally by the reference numeral 30.

Figure 8:
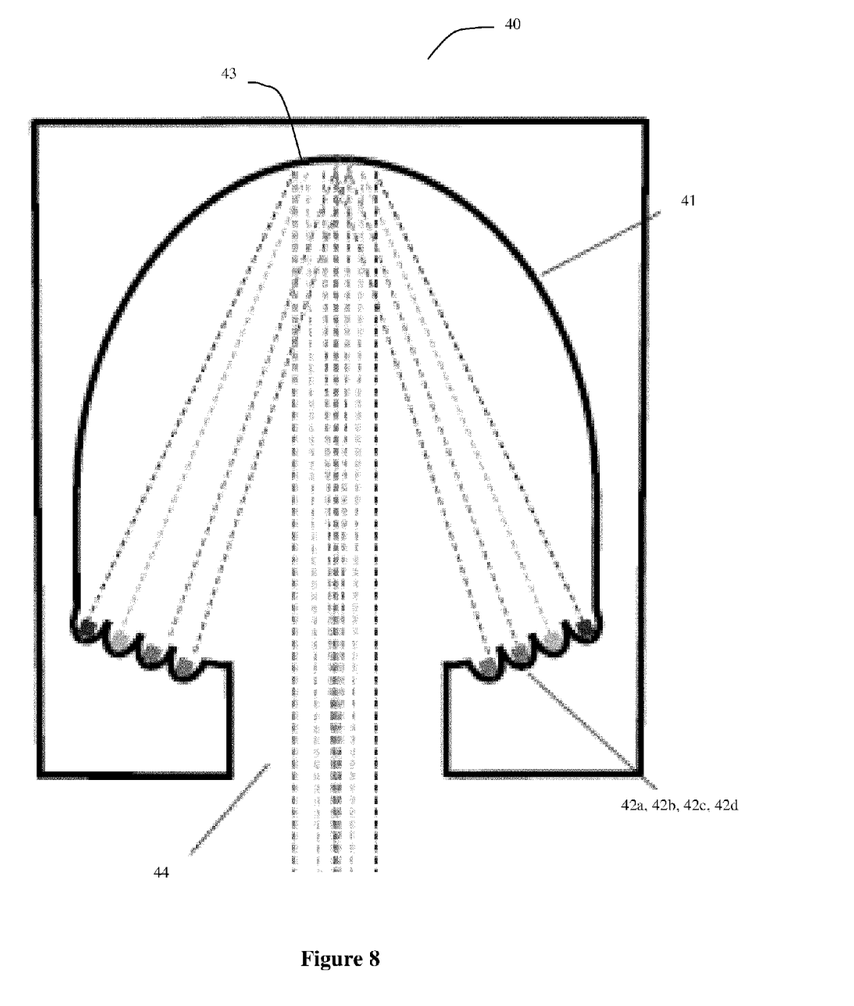
FIG. 8 illustrates an alternative optical cavity for implementing the light source according to another embodiment of the invention.

FIG. 8 illustrates an alternative optical cavity for implementing the light source according to another embodiment of the invention, indicated generally by the reference numeral 40. The optical cavity 41 comprises of an array of discrete LED chips set, 42a, 42b, 42c and 42d, arranged inside the light mixing cavity 41. The LEDs can have a variety of emission wavelengths to provide a broad emission spectrum. The cavity 41 consists of a reflective surface with a parabolic shaped 43 reflector at the top of the cavity. This parabolic reflector collects light emitted from each LED chip and directs it towards an output aperture 44 which can be located at or near the base of the cavity 41. Light beams from all LED chips are combined at the output aperture, as shown by the dotted lines.

The inside cavity 41 can be manufactured from a reflective metal such as Aluminium which also acts as a thermal heatsink. Individual LED chips 42a-42d can be located in miniature reflectors which direct emitted light towards the centre of the parabolic reflector 43.

The position of the LED chips 42a-42d is such that they maximise transmission of the emitted light through the aperture while maintaining as narrow an output aperture 44 as possible. The lower efficiency LED chips are positioned such that they exhibit the lowest optical loss during their transmission in the cavity. This can be achieved by locating them as close to the parabolic reflector 43 as possible.

The reflector may also behave as a heatsink as it can be fabricated from metal, such as Aluminium. Phosphors can be added to individual LED chips to broaden the emission spectrum (the LED acting as the excitation source for the phosphor material). The phosphor can be encapsulated in an epoxy gel that is coated over the LED chip.

It will be appreciated that a key feature of the design of the invention is the ability to emit a continuous and broad spectrum that can be coupled through a narrow aperture, such as a spectrometer or optical fibre. Other features of the design of the wide spectrum light source are:

1) An array of LEDs each with different emission wavelengths assembled within a light mixing cavity, such as integrating sphere, to produce homogeneous and continuous spectral output.

2) The LED emission wavelengths are range from UV to IR.

3) The separation of emission peaks are in the range 25 to 30 nm.

4) The LED array is designed in a non-planar or 3D format, with lower efficiency LEDs located at the highest points in the sub-mount.

5) LED array is configured so that the lower efficiency LEDs are located at the centre of the array for enhanced output coupling through the emission aperture.

6) The internal walls of the light mixing cavity are coated with a highly reflective material, such as Barium Sulphate, to maximise reflectivity and enhance optical mixing.

7) The light source has a narrow output aperture to emit light with a uniform spectral and power profile.

It will be appreciated that the features that make this product solution highly attractive to industry include:

1) Excellent operating efficiency and no heat generation.

2) Consistency of optical performance from batch-to-batch.

3) Superior reliability, with an order of magnitude greater lifetime compared to current lamp products.

4) Longer lifetime eliminates replacement issues such as light re-alignment concerns.

5) Ability to tailor the optical spectrum profile to match customer applications where necessary.

6) Simple power supply and no thermal management issues.

7) Safe, clean and reliable.

8) Continuous improvement in LED technology will ensure future enhanced product releases.

9) Small form-factor and low power requirements will enable use in portable/hand-held diagnostic and analysis instruments, which is a large and growing market.

It will be appreciated that the housing provides an integrating sphere with the LEDs configured in a structured format to achieve efficient spectral mixing.

In the specification the term 'wide spectrum' should be interpreted broadly and should encompass deep ultra violet to infrared, for example from 250 nm to 6000 nm wavelength range.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A wide spectrum light source comprising:
a housing with an aperture, said aperture adapted to emit light;

a plurality of light emitting diode (LED) sources mounted in said housing, said LED sources are arranged at different heights in said housing adapted to provide wide spectrum operation of said light source wherein;

said housing comprises a stepped base portion wherein lower efficiency LEDs are mounted on said stepped base portion at a height higher than higher efficiency LEDs, such that said lower efficiency LEDs are positioned closer to said aperture than higher efficiency LEDs.

2. The wide spectrum light source as claimed in claim 1 wherein said stepped base portion provides a plurality of levels for mounting said light emitting diodes at different heights in said housing.

3. The wide spectrum light source as claimed in claim 1 wherein the lower efficiency LEDs are mounted in the centre of the housing for enhanced output coupling through the aperture.

4. The wide spectrum light source as claimed in claim 1 wherein internal walls of the housing are coated with a reflective material.

5. The wide spectrum light source as claimed in claim 1 wherein said stepped base portion is coated with a reflective material.

6. The wide spectrum light source as claimed in claim 4 wherein said reflective material comprises Barium Sulphate.

7. The wide spectrum light source as claimed in claim 1 wherein said housing comprises a phosphorous coating.

8. The wide spectrum light source as claimed in claim 1 wherein at least two LEDs comprise the same wavelength adapted to provide a smooth spectral profile or spectral balancing.

9. The wide spectrum light source as claimed in claim 1 wherein the housing comprises a light mixing cavity adapted to provide spatially uniform light output at said aperture.

10. The wide spectrum light source as claimed in claim 1 wherein the aperture comprises a narrow slit.

11. The wide spectrum light source as claimed in claim 1 wherein said housing comprises a stepped pyramid shaped base, wherein each step provides an area for mounting said LEDs.

12. The wide spectrum light source as claimed in claim 2 wherein each step of said stepped base portion is angled to maximise the reflection in said housing.

13. A sensor comprising a wide spectrum light source as claimed in any of claim 1.

14. A wide spectrum light source comprising:
a housing with an aperture, said aperture adapted to emit light;
a plurality of light emitting diode (LED) sources mounted in said housing, said LED sources are arranged at different heights in said housing adapted to provide wide spectrum operation of said light source wherein;
said housing comprises a reflector and a stepped portion wherein lower efficiency LEDs are mounted on said stepped portion at a height higher than higher efficiency LEDs, such that said lower efficiency LEDs are positioned closer to said reflector.

15. The wide spectrum light source as claimed in claim 14 wherein the reflector is adapted with a parabolic reflector surface and dimensioned to reflect light emitted from said LED sources and out through said aperture.

* * * * *